US010185090B2

United States Patent
Marchildon et al.

(10) Patent No.: US 10,185,090 B2
(45) Date of Patent: Jan. 22, 2019

(54) SYSTEM AND METHOD FOR DISPERSION-ENABLED QUANTUM STATE CONTROL OF PHOTONS

(71) Applicant: The Governing Council of the University of Toronto, Toronto (CA)

(72) Inventors: Ryan Phillip Marchildon, Mississauga (CA); Amr Saher Helmy, Toronto (CA)

(73) Assignee: THE GOVERNING COUNCIL OF THE UNIVERSITY OF TORONTO, Toronto (CA)

(*) Notice: Subject to any disclaimer, the term of this patent is extended or adjusted under 35 U.S.C. 154(b) by 0 days.

(21) Appl. No.: 15/635,132

(22) Filed: Jun. 27, 2017

(65) Prior Publication Data

US 2017/0371105 A1    Dec. 28, 2017

Related U.S. Application Data

(60) Provisional application No. 62/354,906, filed on Jun. 27, 2016.

(51) Int. Cl.
*G02B 6/12*    (2006.01)
*G02F 1/365*    (2006.01)
(Continued)

(52) U.S. Cl.
CPC ......... *G02B 6/29379* (2013.01); *G02B 6/122* (2013.01); *G02F 1/365* (2013.01);
(Continued)

(58) Field of Classification Search
CPC ..... G02B 6/29379; G02B 6/122; G02B 6/365; G02B 2006/1215; G02B 2006/12164; G02B 2006/12154; G02B 6/29391
See application file for complete search history.

(56) References Cited

U.S. PATENT DOCUMENTS 7,289,738 B1 * 10/2007 Roberts ............... H04B 10/70
398/140
7,639,953 B2 * 12/2009 Spillane ............... B82Y 10/00
250/214.1
(Continued)

OTHER PUBLICATIONS

S. Sauge, M. Swillo, G. B. Xavier, M. Tengner and A. Karlsson, "Single crystal source of polarization entangled photons at non-degenerate wavelengths," 2008 Conference on Lasers and Electro-Optics and 2008 Conference on Quantum Electronics and Laser Science, San Jose, CA, 2008, pp. 1-2.*
(Continued)

*Primary Examiner* — Rhonda S Peace
(74) *Attorney, Agent, or Firm* — ROBIC

(57) ABSTRACT

Devices and methods are described for selecting a level of entanglement between two nondegenerate photons. The method may include receiving two non degenerate photons through a single input port of a directional photonic coupler; adjusting one of a first-order coupler dispersion M or a power splitting ratio η(λ00) of the directional optical coupler to select a Δη; and, emitting the photons from corresponding output ports of the directional optical coupler, wherein the emitted photons have a spectral entanglement corresponding to the selected Δη.

14 Claims, 10 Drawing Sheets

(51) Int. Cl.
*G02B 6/122* (2006.01)
*G02B 6/293* (2006.01)

(52) U.S. Cl.
CPC ...... *G02B 6/12007* (2013.01); *G02B 6/29355* (2013.01); *G02B 2006/1215* (2013.01); *G02B 2006/12164* (2013.01)

(56) References Cited

U.S. PATENT DOCUMENTS

| | | | |
|---|---|---|---|
| 8,173,982 B2* | 5/2012 | Edamatsu | B82Y 10/00 250/493.1 |
| 8,222,623 B2* | 7/2012 | Trojek | G02F 1/3526 250/493.1 |
| 9,291,772 B2* | 3/2016 | Horn | G02F 1/3558 |
| 2017/0052427 A1* | 2/2017 | Earl | G02F 1/39 |
| 2017/0371105 A1* | 12/2017 | Marchildon | G02B 6/29379 |

OTHER PUBLICATIONS

Z. Sang, X. Jiang, T. Zhao, H. Zhang and G. Jin, "Feedback Circuit Module in Frequency-Nondegenerate Entanglement Swapping Experiment," in IEEE Transactions on Nuclear Science, vol. 60, No. 5, pp. 3508-3513, Oct. 2013.*
M. F. Saleh, G. Di Giuseppe, B. E. A. Saleh and M. C. Teich, "Photonic Circuits for Generating Modal, Spectral, and Polarization Entanglement," in IEEE Photonics Journal, vol. 2, No. 5, pp. 736-752, Oct. 2010.*
Abolghasem, P. et. al., Bandwidth control of paired photons generated in monolithic Bragg reflection waveguides, Optics Letters, 34 (13): 2000-2002, Jul. 1, 2009.
Agarwal, G. et. al., Filtering of two-photon quantum correlations by optical cavities: Cancellation of dispersive effects, Physical Review A ,49 (5): 3954-3957, May 1994.
Avenhaus, M. et. al., Fiber-assisted single-photon spectrograph, Optics Letters, 34 (18): 2873-2875, Sep. 15, 2009.
Bromberg, Y. et. al., Quantum and Classical Correlations in Waveguide Lattices, Physical Review Letters, PRL 102: 253904-1 to 253904-4, Jun. 26, 2009.
Chen, J. et. al., Two-photon-state generation via four-wave mixing in optical fibers, Physical Review A 72 033801: 033801-1 to 033801-9, Sep. 2, 2005.
Chen, J. et. a;., Deterministic quantum splitter based on time-reversed Hong-Ou-Mandel interference, Physical Review A 76, 031804(R): 031804-1 to 031804-4, Sep. 26, 2007.
Christensen, B.G. et. al., Detection-Loophole-Free Test of Quantum Nonlocality, and Applications, Physical Review Letters, PRL 111: 130406-1 to 130406-5, Sep. 26, 2013.
Davanço, M. et. al., Telecommunications-band heralded single photons from a silicon nanophotonic chip, Applied Physics Letters, 100 (261104): 261104-1 to 261104-4, Jun. 25, 2012.
Digonnet, M. et. al., Analysis of a Tunable Single Mode Optical Fiber Coupler, IEEE Transactions on Microwave Theory and Techniques, MTT-30 (4): 592-600, Apr. 1982.
Eckstein, A. et. al., Highly Efficient Single-Pass Source of Pulsed Single-Mode Twin Beams of Light, Physical Review Letters, PRL 106: 013603-1 to 013603-4, Jan. 7, 2011.
Griffel, G. et. al., Frequency Response and Tunability of Grating-Assisted Directional Couplers, IEEE Journal of Quantum Electronics, 27 (5): 1115-1118, May 1991.
Hill, S. et. al., Entanglement of a Pair of Quantum Bits, Physical Review Letters, 78 (26): 5022-5025, Jun. 30, 1997.
Hong, Z. et. al., Measurement of Subpicosecond Time Intervals between Two Photons by Interference, Physical Review Letters, 59 (18): 2044-2046, Nov. 2, 1987.
Horn, R. et. al., Inherent polarization entanglement generated from a monolithic semiconductor chip, Scientific Reports, 3 (2314): 1-5, Jul. 30, 2013.
Horodecki, R. et. al., Quantum entanglement, Reviews of Modern Physics, 81 (2): 865-942, Apr.-Jun. 2009.
Humble, T. et. al., Effects of spectral entanglement in polarization-entanglement swapping and type-I fusion gates, Physical Review A 77, (022312): 022312-1 to 022312-9, Feb. 11, 2008.
Jin, R. et. al., Widely tunable single photon source with high purity at telecom wavelength, Optics Express, 21 (9): 10659-10666, Apr. 24, 2013.
Jin, H. et. al., On-Chip Generation and Manipulation of Entangled Photons Based on Reconfigurable Lithium-Niobate Waveguide Circuits, Physical Review Letters, PRL 113 (103601): 103601-1 to 103601-5, Sep. 5, 2014.
Kang, D. et. al., Two-photon quantum state engineering in nonlinear photonic nanowires, Journal of Optical Society of America B, 31 (7): 1581-1589, Jul. 2014.
Kumar, R. et. al., Controlling the spectrum of photons generated on a silicon nanophotonic chip, Nature Communications 5: 5489, 1-7, Nov. 20, 2014.
Laing, A. et. al., High-fidelity operation of quantum photonic circuits, Applied Physics Letters, 97 (211109): 211109-1 to 211109-3, Nov. 23, 2010.
Lemos, G.B. et. al., Quantum Imaging with Undetected Photons, 1-19, 2018.
Lo, H-K. et. al., Measurement-Device-Independent Quantum Key Distribution, Physical Review Letters, PRL 108 (130503): 130503-1 to 130503-5, Mar. 30, 2012.
Luxmoore, I.J. et. al., III—V quantum light source and cavity-QED on Silicon, Scientific Reports, 3: (1239): 1-5, Feb. 7, 2013.
Ma, X-S. et. al., Quantum simulation of the wavefunction to probe frustrated Heisenberg spin systems, Nature Physics 7, 399-405 (2011), ArXiv:1008.4116v2 [quant-ph], 1-9, Feb. 7, 2012.
Marcuse, D. et. al., Directional Couplers Made of Nonidentical Asymmetric Slabs Part 11: Grating-Assisted Couplers, Journal of Lightwave Technology, LT-5 (2) , 268-273, Feb. 1987.
Matsuda, N. et. al., A monolithically integrated polarization entangled photon pair source on a silicon chip, Scientific Reports, 2 (817): 1-6, Nov. 12, 2012.
Matthews, J. et. al., Manipulating multi-photon entanglement in waveguide quantum circuits, 1-8, arXiv:0911.1257v1 [quant-ph] Nov. 6, 2009.
Marchildon, R. et. al., Dispersion-enabled quantum state control in integrated photonics: supplementary material, OPTICA, 1-3, Mar. 3, 2016.
Takagi, A. et. al., Wavelength characteristics of (2x2) optical channel-type directional couplers with symmetric or nonsymmetric coupling structures, Journal of Wavelength Technology, 10 (6): 735-746, Jun. 1992.
Yariv, A., Coupled-mode theory for guided-wave optics, IEEE Journal of Quantum Electronincs, QE-9 (9): 919-933, Sep. 1973.
Rubin, M.H. et. al., Theory of two-photon entanglement in type-ii optical parametric down-conversion, Physical Review A, 50 (6): 5122-5133, Dec. 1994.
Yang, Z. et. al., Spontaneous parametric down-conversion in waveguides: A backward heisenberg picture approach, Phyical Review A, 033808-1 to 033808-13, Mar. 2008.
Peschel, U. et. al., A compact device for highly efficient dispersion compensation in fiber transmission, American Institute of Physics, 67 (15): 2111-2113, Aug. 2, 1995.
West, B.R. et. al., Dispersion tailoring of the quarter-wave Bragg reflection waveguide, Optic's Express, 14 (9): 4073-4086, Apr. 18, 2006.
Parker, S. et. al., Entanglement quantification and purification in continuous-variable systems, Physical Review A, 61 (032305): 032305-1 to 0323205-8, Feb. 10, 2000.

\* cited by examiner $$|\Psi\rangle = \frac{[|\psi\rangle_A|0\rangle_B + e^{-i\theta}|0\rangle_A|\psi\rangle_B]}{\sqrt{2}}, \tag{1}$$

$$|\psi\rangle_j = \int d\omega_1 d\omega_2 \phi^j(\omega_1, \omega_2) \hat{a}^{j\dagger}(\omega_1) \hat{a}^{j\dagger}(\omega_2) |\text{vac}\rangle, \tag{2}$$

$$\phi(\omega_1, \omega_2) = \phi_P(\omega_1 + \omega_2)[\phi_1(\omega_1)\phi_2(\omega_2) + \phi_2(\omega_1)\phi_1(\omega_2)], \tag{3}$$

$$\begin{bmatrix} \hat{b}^{A\dagger}(\omega) \\ \hat{b}^{B\dagger}(\omega) \end{bmatrix} = \begin{bmatrix} \cos(\kappa(\omega)L) & i\sin(\kappa(\omega)L) \\ i\sin(\kappa(\omega)L) & \cos(\kappa(\omega)L) \end{bmatrix} \begin{bmatrix} \hat{a}^{A\dagger}(\omega) \\ \hat{a}^{B\dagger}(\omega) \end{bmatrix}, \tag{4}$$

$$\Phi^{j \to pq}(\omega_1, \omega_2) = \phi^j(\omega_1, \omega_2) G^{j \to p}(\omega_1) G^{j \to q}(\omega_2), \tag{5}$$

FIG. 9

$$G^{j \to q}(\omega) = \begin{cases} \cos(\kappa(\omega)L), & \text{if } j = q \\ \sin(\kappa(\omega)L), & \text{if } j \neq q \end{cases} \quad (6)$$

$$P_{pq} = R^C_{pq} + \cos(\pi \delta_{pq}) R^I_{pq}(\theta), \quad (7)$$

$$R^C_{pq} = \int d\omega_1 d\omega_2 (|\Phi^{A \to pq}(\omega_1, \omega_2)|^2 + |\Phi^{B \to pq}(\omega_1, \omega_2)|^2), \quad (8)$$

$$R^I_{pq}(\theta) = \int d\omega_1 d\omega_2 2\text{Re}\{e^{-i\theta} \Phi^{B \to pq}(\omega_1, \omega_2) \Phi^{*A \to pq}(\omega_1, \omega_2)\}, \quad (9)$$

$$P_S = P_{AB} + P_{BA} = P^C_S + P^I_S, \quad (10)$$

$$V_S = \frac{|P_S(\Lambda, 0) - P_S(\Lambda, \tau)|}{P_S(\Lambda, \tau)} = \frac{|1 - R_\tau/R_0|}{R_\tau/R_0} = \left|\frac{R_0}{R_\tau} - 1\right|. \quad (11)$$

FIG. 10

SYSTEM AND METHOD FOR DISPERSION-ENABLED QUANTUM STATE CONTROL OF PHOTONS

CROSS REFERENCE TO RELATED APPLICATIONS

This application claims the benefit of priority to U.S. Provisional Patent Application Ser. No. 62/354,906 filed on Jun. 27, 2016 and entitled System and Method for Dispersion-Enabled Quantum State Control of Photons, the contents of which are incorporated by reference.

FIELD OF THE INVENTION

The present invention generally pertains to the field of photonic couplers, and particular embodiments or aspects relate to photonic directional couplers adapted for dispersion-enabled quantum state control of photons.

BACKGROUND

Integrated optics has brought unprecedented levels of stability and performance to quantum photonic circuits. However, integrated devices are not merely micron-scale equivalents of their bulk-optics counterparts.

The quantum properties of light can unlock a variety of enhanced and novel technological capabilities. Among these are secure communications, nonclassical simulation, nonlocal imaging, and pathway-selective exciton spectroscopy. Such quantum photonic technologies have traditionally been implemented on the bench top with discrete optical components. More recently, the need for improved scalability has fuelled widespread interest in the development of on-chip quantum circuits. Much of this work has concentrated on the generation, manipulation, and detection of entangled photon pairs, often with the goal of replicating tasks previously performed using bulk optics.

There may be a need, however, for a system and method for quantum photonics that is not subject to one or more limitations of the prior art. In some embodiments, there is a need for an integrated optical component that may support quantum photonics in place of conventional bulk optics.

This background information is intended to provide information that may be of possible relevance to the present invention. No admission is necessarily intended, nor should be construed, that any of the preceding information constitutes prior art against the present invention.

SUMMARY

Integrated optical components can exhibit highly wavelength-dependent (i.e., dispersive) behavior compared to their bulk optics counterparts. Such dispersion has been shown to provide unprecedented tailorability over the properties of two-photon states generated by engineered nonlinear interactions in integrated waveguides.

By exploiting the inherently dispersive characteristics of the integrated optical component setting, such devices can play a remarkably more versatile role in quantum circuit architectures. In an embodiment, an ordinary photonic directional coupler may be adapted to support linear dispersion of photons. Dispersion unlocks several novel capabilities for the adapted photonic directional coupler including in situ control over photon spectral and polarization entanglement, tunable photon time ordering, and entanglement-sensitive two-photon coincidence generation.

In an embodiment, perfect two-photon anti-coalescence may be maintained while tuning the interference visibility.

In an embodiment, a method is provided for selecting a level of entanglement between two nondegenerate photons. The method may include receiving two non degenerate photons through a single input port of a directional photonic coupler; adjusting one of a first-order coupler dispersion M or a power splitting ratio $\eta(\lambda 00)$ of the directional optical coupler to select a $\Delta\eta$; and, emitting the photons from corresponding output ports of the directional optical coupler, wherein the emitted photons have a spectral entanglement corresponding to the selected $\Delta\eta$. In an implementation, the adjusting may comprise adjusting a waveguide core-cladding index of the directional optical coupler. In an implementation, the adjusting may comprise adjusting a separation of waveguides of the directional optical coupler. In an implementation, the method may further comprise selecting a level of time-ordering between the two nondegenerate photons by, applying a time delay $\tau$ to one of the output ports, wherein the time delay converts the selected $\Delta\eta$ path-entanglement characteristics into time-ordering characteristics of the emitted photons. In an implementation, the method may further comprise selecting a level of interference visibility at a fixed photon pair anti-bunching (separation) rate for the two nondegenerate photons, wherein the receiving two non degenerate photons further comprises receiving two nondegenerate photons that are path-entangled across two input ports of the directional optical coupler with a relative phase of $\theta=\pi$ between paths; and, wherein the adjusting comprises: for a given M, adjusting $\eta(\lambda 00)$ of the directional optical coupler to select a desired interference visibility.

In an embodiment, a device is provided for selecting a level of entanglement between two nondegenerate photons. The device may include: a directional optical coupler adapted to receive two non degenerate photons through a single input port; means for adjusting a power splitting ratio $\eta(\lambda)$ of the directional optical coupler to a selected $\Delta\eta$; wherein emitted photons from the directional optical coupler have a spectral entanglement corresponding to the selected $\Delta\eta$. In an implementation, the means for adjusting the power splitting ratio $\eta(\lambda)$ comprises means for adjusting a waveguide core-cladding index of the directional optical coupler. In an implementation, the means for adjusting the power splitting ratio $\eta(\lambda)$ comprises means for adjusting a separation of waveguides of the directional optical coupler. In an implementation, the means for adjusting the power splitting ratio $\eta(\lambda)$ comprises a coupling length of the directional optical coupler longer than a minimum necessary value ($L=\pi/(4\kappa(\lambda_{00}))$). In an implementation, the device is further operative to select a level of time-ordering between the two nondegenerate photons, wherein the device further comprises an extended path in one leg of the directional optical coupler, the extended path applying a time delay $\tau$ to one of the output ports, wherein the time delay $\tau$ converts the selected $\Delta\eta$ path-entanglement characteristics into time-ordering characteristics of the emitted photons. In an implementation, the device is further operative to select a level of interference visibility at a fixed photon pair anti-bunching (separation) rate for the two nondegenerate photons, wherein the directional optical coupler is adapted to receive the two non degenerate photons as path-entangled photons across two input ports of the directional optical coupler with a relative phase of $\theta=\pi$ between paths; and, for a given M, the means for adjusting a power splitting ratio $\eta(\lambda)$ of the directional optical coupler comprises means for adjusting $\eta(\lambda 00)$ of the directional optical coupler to select a desired interference visibility.

In an embodiment, a method is provided for selecting a level of entanglement between two nondegenerate photons comprising: receiving two non degenerate photons through a single input port of a directional coupler; adjusting M or $\eta(\lambda 00)$ of the directional coupler to select a desired $\Delta\eta$; emitting the photons from corresponding output ports of the directional coupler, wherein the emitted photons have a spectral entanglement corresponding to the selected $\Delta\eta$.

In an embodiment, a method is provided for selecting a level of time-ordering between two nondegenerate photons comprising: receiving two non degenerate photons through a single input port of a directional coupler; adjusting M or $\eta(\lambda 00)$ of the directional coupler to select a desired $\Delta\eta$; emitting the photons from corresponding output ports of the directional coupler, wherein the emitted photons have path-entanglement characteristics corresponding to the selected $\Delta\eta$; and, applying a time delay $\tau$ to one of the output paths, wherein this time delay converts the path-entanglement characteristics selected by $\Delta\eta$ into time-ordering characteristics.

In an embodiment, a method is provided for selecting a level of interference visibility at a fixed photon pair anti-bunching (separation) rate for two nondegenerate photons comprising: receiving two nondegenerate photons that are path-entangled across two input ports of a directional coupler with a relative phase of $\theta=\pi$ between paths; for a given M, adjusting $\eta(\lambda 00)$ of the directional coupler to select a desired interference visibility.

In an embodiment, a method is provided for extracting the spectral entanglement of two photons of known nondegeneracy ($\Lambda$) and bandwidth ($\Delta\lambda$) comprising: receiving two photons that are path-entangled across two input ports of a directional coupler; measuring photon counts at the directional coupler output ports, including a rate at which the two photons exit from different ports; and, calculating the spectral entanglement of the photons using the measured count rates, and the values of M, $\eta(\lambda 00)$, $\theta$, $\Delta\lambda$, and $\Lambda$.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIGS. 9 & 10 illustrate useful equations.

DETAILED DESCRIPTION

In some embodiments, new ways of leveraging dispersion in photonic directional couplers for the manipulation of two-photon states and their correlation properties are presented.

Photonic directional couplers (also referred to as "couplers" or "directional couplers") are a common building block of integrated quantum circuits whose dispersion properties have yet to be fully exploited. They are typically implemented through the evanescent coupling of two identical waveguides and are characterized by a power splitting ratio $\eta(\lambda)$. Their primary role has been to serve as on-chip beam splitters, often to mediate quantum interference. Due to the presence of dispersion in $\eta(\lambda)$, these same couplers can also act as a wavelength demultiplexer (WD) for specific sets of nondegenerate wavelengths, without relying on waveguide modal mismatch. In fact, dispersion can cause the coupler's behavior to transition between "ideal" beam splitter operation and "ideal" WD operation in response to either the properties of the quantum state or systematic shifts to the coupling strength. The implications this has for two-photon state manipulation has yet to be studied. We show that this attribute of photonic directional couplers grants them a versatile set of new functionalities, which includes the post-selective tuning of spectral entanglement, entanglement-sensitive coincidence detection, and the ability to maintain perfect anti-coalescence while allowing full tunability over the two-photon interference visibility.

In some embodiments, symmetric 2×2 directional couplers are described as an example of quantum state engineering in integrated photonic systems without the loss of generality. As such, an essential step is to parameterize the photonic directional coupler's response for the two-photon state in terms of generic dimensionless variables that can be mapped to any combination of coupler and state properties. The details of this parametrization are described below, but some key definitions are introduced here.

Figure 1A:
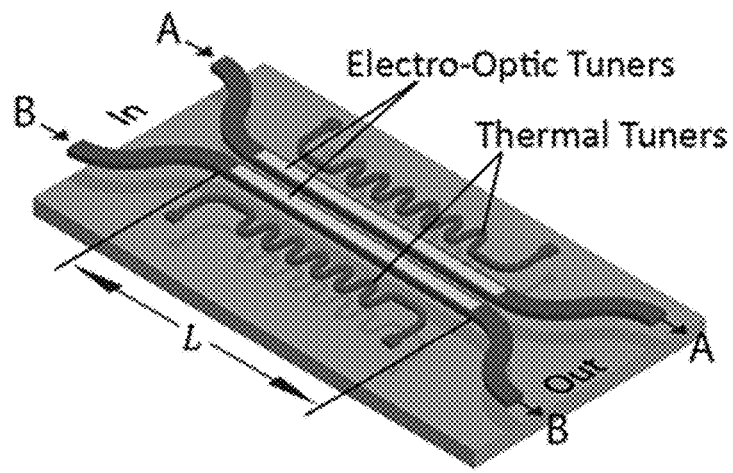
FIG. 1a illustrates an embodiment of a two-port directional coupler.
Figure 1B:
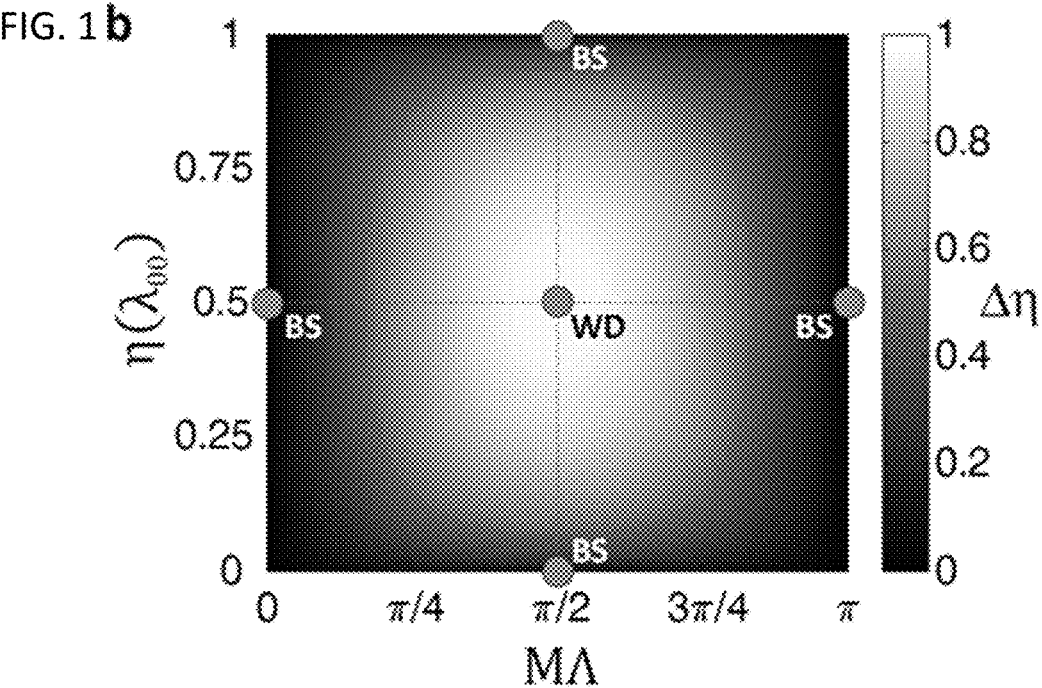
FIG. 1b illustrates a map of possible coupler responses to a two-photon input state, according to an embodiment

FIG. 1a illustrates a generic two-port directional coupler, shown with simple implementations of thermal and/or electro-optic tuning for in situ control over $\eta(\lambda_{00})$ on each of the coupler paths. FIG. 1b illustrates an illustrative map of possible coupler responses to a two-photon input state, as characterized by $\Delta\eta$. The coordinates labelled BS denote 50:50 beamsplitter behavior, while WD denotes perfect demultiplexing of central wavelengths $\lambda_{01}$ and $\lambda_{02}$.

Suppose two single-mode waveguides are coupled over a length L, such as in FIG. 1a. For symmetric rectangular waveguides, this leads to a power splitting ratio of $\eta(\lambda) = \cos^2(\kappa(\lambda)L)$, where $\kappa(\lambda)$ is the coupling strength. The wavelength dependence of the coupler is usually sufficiently described by its first-order coupler dispersion $M=d(\lambda)L/d\lambda$ at a reference wavelength $\lambda_{00}$, together with the value of $\eta(\lambda_{00})$. Let $\lambda_{01}$ and $\lambda_{02}$ be the central wavelengths of a photon pair that evolves through this coupler, with $\Lambda=|\lambda_{02}-\lambda_{01}|$ giving the nondegeneracy. Defining $\Delta\eta=|\eta(\lambda_{02})-\eta(\lambda_{01})|$ allows the coupler response to be classified as beam splitter-like for $\Delta\eta\to 0$ or WD-like for $\Delta\eta\to 1$.

The space of all possible $\Delta\eta$ is spanned by $\eta(\lambda_{00})$ and the dimensionless product $M\Lambda$. This has been plotted in FIG. 1b, assuming $\lambda_{00}=(\lambda_{01}+\lambda_{02})/2$ and negligible higher-order coupler dispersion. This plot provides a useful guide for relating the results described in the present application to transitions between beam splitter and WD behavior. A special condition, $\eta(\lambda_{01})+\eta(\lambda_{02})=1$, occurs along the lines $\eta(\lambda_{00})=0$ and $M\Lambda=\pi/2$, and corresponds to the splitting ratios $\eta(\lambda_{01})$ and $\eta(\lambda_{02})$ being antisymmetric about the 50:50 splitting value $\eta=0.5$.

Parameterization of Coupler Response

The analysis presented in this application assumes that the waveguides are single-mode, identical, and rectangular (i.e. non-tapered) as illustrated in FIG. 1a, although more sophisticated design geometries are possible. Spatial mode overlap between the waveguides leads to $\eta(\lambda)=\cos^2(\kappa(\lambda)L)$ in terms of a coupling strength $\kappa(\lambda)$ over an interaction length L. As defined, $\eta(\lambda)$ represents the probability that a photon exits from the same waveguide it enters from (i.e. $\eta(\lambda)=1$ means no power is transferred).

It is useful to parameterize the coupler's response to the two-photon state in terms of generic dimensionless variables that can be mapped to any combination of coupler and state properties. The dimensionless product $M\Lambda$, where $\Lambda=|\lambda_{02}-\lambda_{01}|$ is the photon pair non-degeneracy and $M=d_\kappa(\lambda)L/d\lambda$ is the first-order coupler dispersion, gives the absolute difference in $\kappa(\lambda)L$ between the photon central wavelengths. For discussing spectral dependencies, the product $M\Delta\lambda$, similarly gives the absolute difference in $\kappa(\lambda)L$ across the FWHM of the marginal spectra.

A convenient parameter space for navigating the coupler response can be created from $\eta(\lambda_{00})$ and $M\Lambda$ if the reference wavelength $\lambda_{00}$ is taken to be the average of the photon central wavelengths $\lambda_{01}$ and $\lambda_{02}$. For photon pairs with a tunable non-degeneracy, such as those generated through spontaneous nonlinear interactions, $\lambda_{00}$ can be set as the photon pair degeneracy wavelength, since $\lambda_{01}$ and $\lambda_{02}$ tend to remain approximately equidistant from the degeneracy point for $\Lambda$ of up to hundreds of nanometers. All possible coupler responses to the quantum state then occur within the bounds $\eta(\lambda_{00})\in[0, 1]$ and $M\Lambda\in[0, \pi]$. Behaviours for $M\Lambda>\pi$ can be mapped back to the interval $M\Lambda\in[0, \pi]$ FIG. 1b shows how $\Delta\eta$ varies within these bounds. There are four coordinates where the coupler responds as a 50:50 beamsplitter with $\eta(\lambda_{01})=\eta(\lambda_{02})=0.5$, and one central coordinate where it responds as a WD with $\Delta\eta=1$. These provide a reference for tracking transitions between beamsplitter and WD behaviour. The special condition $\eta(\lambda_{01})+\eta(\lambda_{02})=1$ occurs along the lines $\eta(\lambda_{00})=0$ and $M\Lambda=\pi/2$, where the splitting ratios at $\lambda_{01}$ and $\lambda_{02}$ are anti-symmetric about $\eta=0.5$. We note that if the assumptions of linear $\kappa(\lambda)$ or $\lambda_{00}=|\lambda_{01}+\lambda_{02}|/2$ break down, the parameter space shown in FIG. 1b becomes skewed with respect to the horizontal axis.

Dispersive Coupler Example

An example of an embodiment of a photonic directional coupler is now presented. The example is intentionally simplistic to show an embodiment with limited deviation from conventional coupler designs. More optimal approaches will also be discussed.

We consider the manipulation of photon pairs degenerate at 1550 nm in the telecom band, having a maximum tunable nondegeneracy of at least $\Lambda=50$ nm. Such states can be generated through waveguide-based SPDC. In this example we seek a coupler that can reach the operating point $M\Lambda=\pi/2$ within this tunable range.

Figure 2:
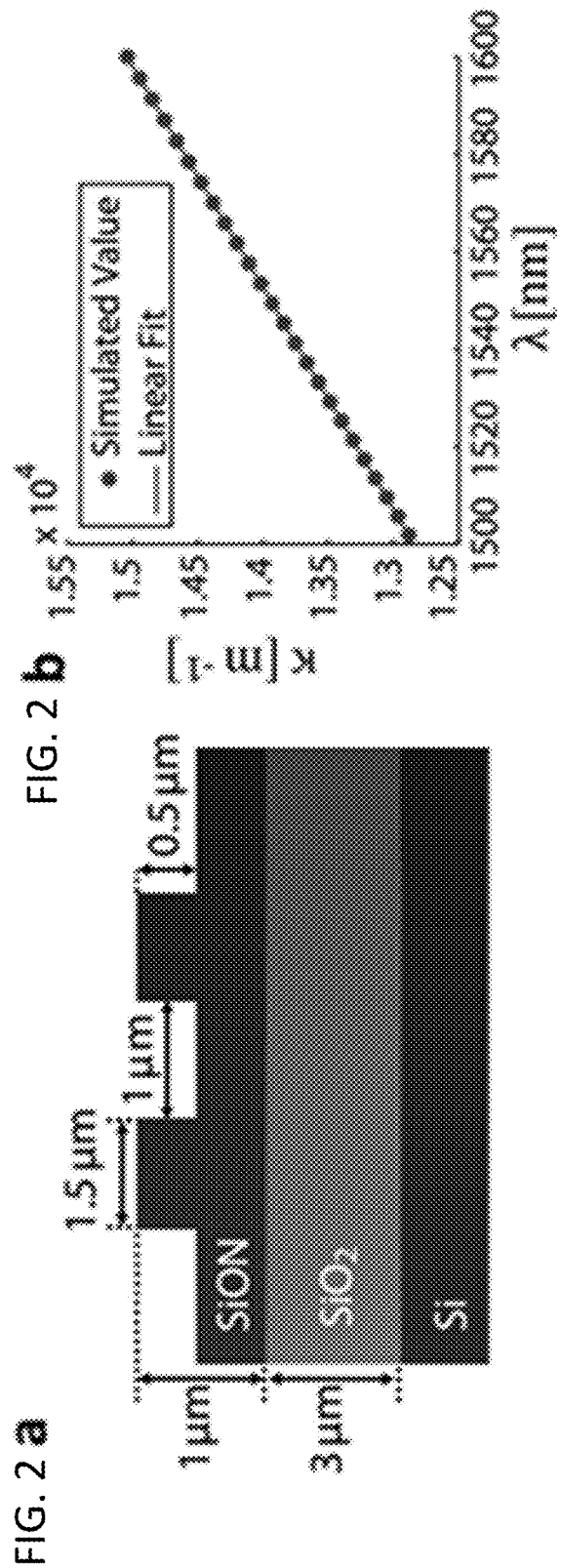
FIG. 2a illustrates an embodiment of a coupler.
FIG. 2b illustrates coupling strength for the coupler of FIG. 2a, according to an embodiment.

The design of the coupler is shown in FIG. 2a and is straightforward to fabricate with conventional coupler manufacturing techniques. FIG. 2b shows the coupling strength for the coupler of FIG. 2a in the vicinity of 1550 nm, which is linear and described by $\kappa(\lambda)=2.2055\times10^{10}\lambda - 2.0245\times10^4$ m$^{-1}$. For 50:50 splitting at the degeneracy point, the smallest suitable interaction length is L=56.3 μm. From the definition of M, this yields $M\Lambda=0.0621\approx\pi/50$ at the maximum non-degeneracy of $\Lambda=50$ nm, which is below our target. However, since M scales linearly with L, we can multiply the dispersion by choosing a larger value of L that still gives 50:50 splitting at degeneracy. An interaction length of L=1521 μm achieves this and gives $M\Lambda=1.07\times\pi/2$ for our design, meeting our objective While the approach above shows that the dispersion can be made arbitrarily large by increasing the device length, this comes at the price of increasing its footprint and insertion losses. Typical losses at 1550 nm for this silicon-nitride waveguide geometry are around 3 dB/cm, and hence roughly 10% of the photons would be lost in the design we described. However, this serves merely as an illustrative example. More sophisticated coupler designs exhibiting appreciable dispersion have been studied in the past including grating assisted couplers and couplers implemented in asymmetric vertical structures, including Bragg Reflection waveguides. These can alternative structures may provide more compact and efficient ways of achieving the necessary dispersion.

Calculation of Spectral Entanglement

The spectral entanglement of a state is completely described by its biphoton amplitude (BPA), which is defined in the Appendix of the main text. For a given BPA, the Schmidt Number is calculated from $SN=1/[\Sigma_n p^2_n]$, where the $p_n$ are the eigenvalues of the matrix $$\rho_{\omega\omega'}=\int d\omega''\phi(\omega,\omega'')\phi^*(\omega',\omega''), \quad (1)$$

and are normalized according to $\Sigma_n p_n=1$. To quantify the entanglement of anti-bunched states at the coupler output, we associate the labels 1 and 2 with output paths A and B respectively, and post-select for terms containing $$\hat{b}^{A\dagger}(\omega_1)\hat{b}^{B\dagger}(\omega_2)|\hat{v}ac\rangle.$$

The associated BPA is proportional to $$\Xi^{AB}(\omega_1,\omega_2)=\Phi^{A\to AB}(\omega_1,\omega_2)+\Phi^{B\to AB}(\omega_1,\omega_2), \quad (2)$$

which replaces $\varphi(\omega_1, \omega_2)$ in Equation (1). For the non-path-entangled input state $|\psi\rangle_A$, we set $\Phi^{B\to AB}(\omega_1, \omega_2)$ to zero.

Bandwidth Dependence

Figure 3A:
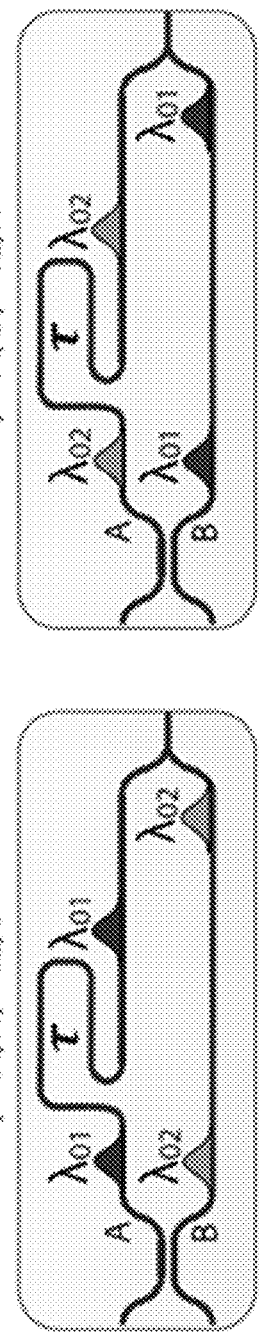
FIGS. 3a-3c, illustrate the dependence of two-photon path correlations on coupler response, according to an embodiment.
Figure 3B:
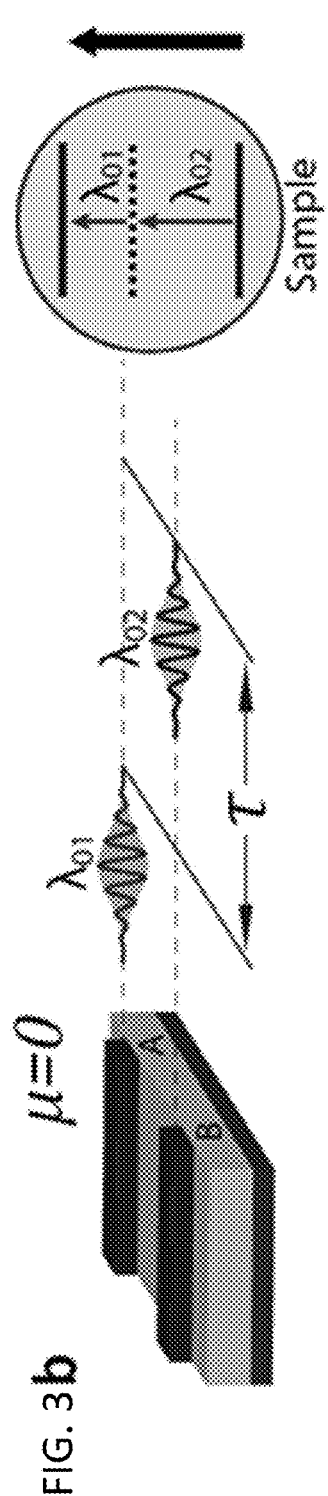
Figure 3C:
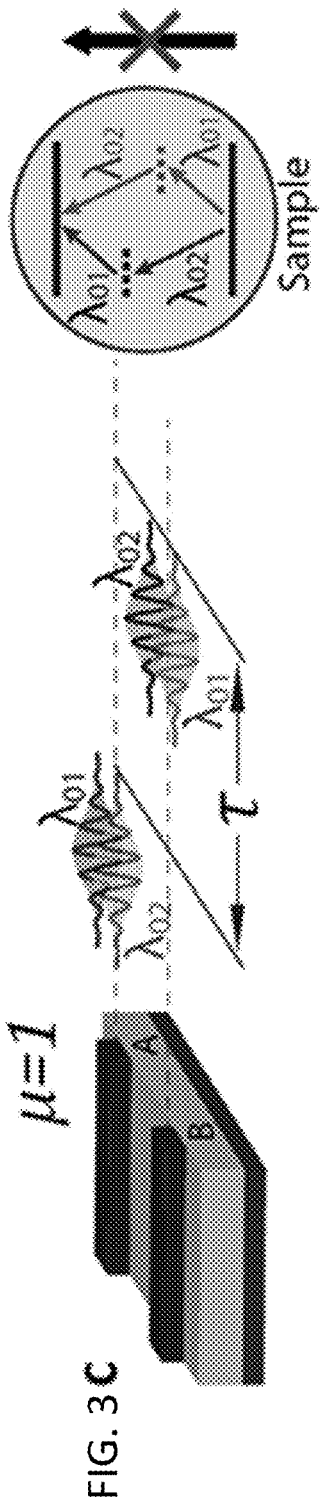

FIGS. 3a-3c, illustrate the dependence of two-photon path correlations on coupler response. The dependence changes with bandwidth.

FIGS. 3a-3c illustrate techniques for probing matter with tunable time ordering. FIG. 3a illustrates photons leaving a coupler from different output ports having two possible pathways: $|\lambda_{01}\rangle A|\lambda_{02}\rangle B$ or $|\lambda_{01}\rangle B|\lambda_{02}\rangle A$. These coincide temporally and hence are mutually coherent. The photon in waveguide A is then temporally delayed by an interval τ relative to its twin photon in waveguide B, so that one photon always arrives at the sample before the other. The wavelength of the delayed photon depends on whether the pathway was $|\lambda_{01}\rangle A|\lambda_{02}\rangle B$ or $|\lambda_{01}\rangle B|\lambda_{02}\rangle A$. FIG. 3b illustrates the case for $\mu=0$, where only the $|\lambda_{01}\rangle_A|\lambda_{02}\rangle_B$ pathway is allowed, such that the photon of wavelength $\lambda_{02}$ is always absorbed first. FIG. 3c illustrates the case for $\mu=1$, where the superposition permits two absorption pathways: $\lambda_{02}$ followed by $\lambda_{01}$, and $\lambda_{01}$ followed by $\lambda_{02}$. In certain systems where it is not possible to distinguish which of these pathways led to the final state of the sample, the pathways destructively interfere to suppress the two-photon absorption probability. Note that at $\mu=1$ the pathways $|\lambda_{01}\rangle_B|\lambda_{02}\rangle_A$ and $|\lambda_{01}\rangle_A|\lambda_{02}\rangle_B$ are also present due to nondeterministic separation (the coupler behaves as a beam splitter rather than a WD), yielding photons with no relative delay. These are not time ordered but do support both absorption pathways and therefore compliment the path-interference effects.

FIGS. 4a-4f illustrate the dependence of two-photon path correlations on coupler response. Calculations depict FIG. 1a the "classical" separation probability, FIGS. 1b-c the contribution of quantum interference, FIG. 1d the resultant interference visibility, and FIGS. 1e-f total separation probability. Toggling the phase shift from $\theta=0$ to $\theta=\pi$ leads to a sign change for PIS but leaves its magnitude |PIS| unaltered. This sign change, in turn, toggles the line of maximal PS between $\eta(\lambda00)=0.5$ and $M\Lambda=\pi/2$, respectively.

Figure 4A:
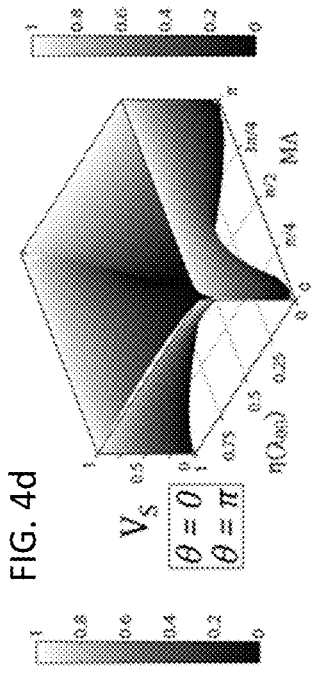
FIGS. 4a-4f illustrate the dependence of two-photon path correlations on coupler response, according to an embodiment.
Figure 4B:
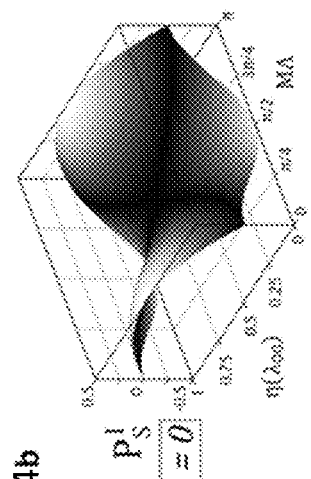
Figure 4C:
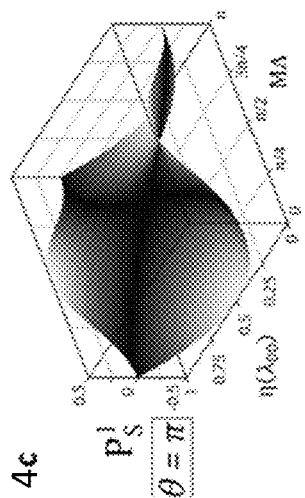
Figure 4D:
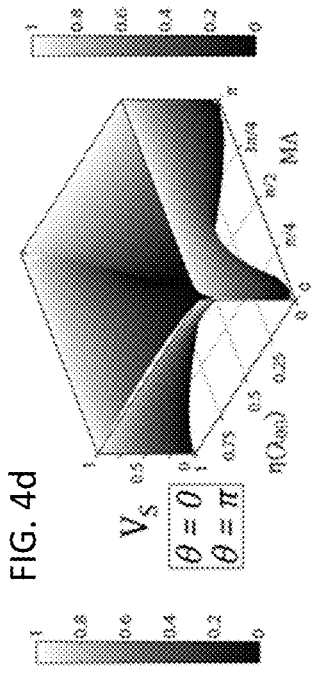
Figure 4E:
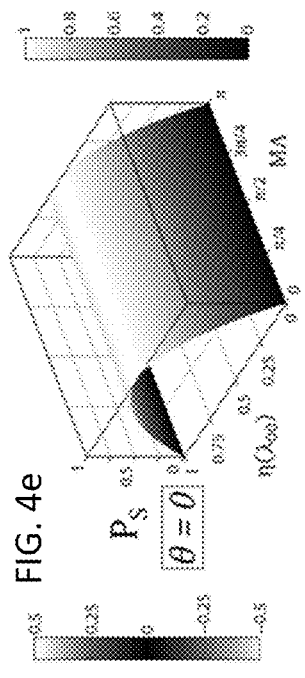
Figure 4F:
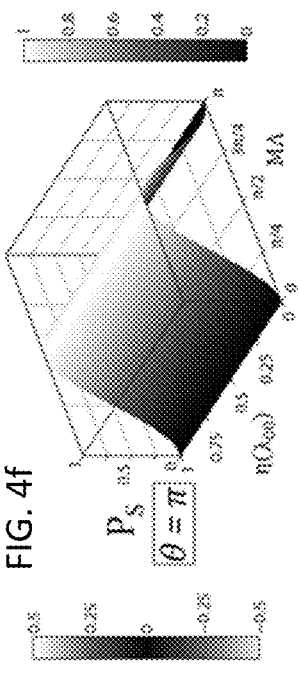

When the product $M\Delta\lambda$ increases but spectral entanglement remains low (i.e. SN≈1), FIGS. 4a-f all begin to flatten. In FIG. 4a, the classical contribution $P^C_S$ at all coordinates approaches a value of 0.5; the interference contributions $P^I_S$ and visibility $V_S$ in FIGS. 4(b)-(d) all approach zero; correspondingly the total separation probability $P_S$ approaches 0.5 in FIGS. 4(e)-(f). In comparison, when the photons are highly frequency-entangled, increases to $M\Delta\lambda$ do not flatten the surfaces uniformly in this way. Instead, for FIGS. 4(a)-(d) it causes the surfaces to 'smear' along the $M\Lambda$ axis, with the effect of averaging the values along this axis. FIGS. 4(e)-(f) are exceptions: for large values of SN, $P_S$ at $\theta=0$ remains relatively unchanged from its values at small bandwidths; however, $P_S$ at $\theta=\pi$ instead flattens to approach values of 0.5. These differ because the smearing of FIGS. 4(a)-(d) along the $M\Lambda$ axis alters the symmetry in how the $P^C_S$ and $P^I_S$ contributions sum between the two cases.

Bunched Probabilities and Visibility

In addition to the separated (anti-bunched) probabilities $P^C_S$, $P^I_S$, and $P_S$, there is naturally a complementary set of bunched probabilities $P^C_B$, $P^I_B$, and $P_B$, corresponding to outcomes where the photons exit together from the same output port. For anticoalescence, these are related as follows: $P_S+P_B=1$; $P^C_S+P^C_B=1$; and $|P^I_S|=|P^I_B|$. It is likewise possible to define a bunched outcome interference visibility $VB=|P^I_B|/P^C_B$, which behaves differently from $V_S$. The behaviour of these visibilities also depends on whether we are implementing coalescence (i.e. with photons beginning in different waveguides) or anti-coalescence (i.e. with photons beginning in the same waveguide). For simplicity, consider the familiar case where the coupler is non-dispersive and hence $\eta$ is a fixed value. For coalescence such as in the HOM effect, $V_S=2\eta(1-\eta)/[\eta^2+(1-\eta)^2]$, while $V_B=1$ and is independent of $\eta$ because the classical and non-classical contributions to PB scale identically. These behaviours are reversed for anti-coalescence. We also note that without dispersion, both visibilities must be equal to unity for perfect coalescence or anti-coalescence to occur. However, with dispersion, this requirement is lifted.

Dispersion-Enabled Capabilities

Tunable Spectral Entanglement

Suppose two nondegenerate photons enter a directional coupler from a single input port so that the input state takes the form $|\psi\rangle_{in}=|\lambda_{01}\rangle_j|\lambda_{02}\rangle_j$, where $j\in\{A,B\}$. The two-photon state at the output of the coupler is then post-selected for outcomes where the photons exit from different waveguides (i.e., separated). Depending on the coupler response, the output waveguide taken by a given photon can reveal information about that photon's spectral properties, which in turn alters the spectral entanglement of the post-selected output state. A WD-like response with $\Delta\eta=1$ predetermines which photon emerges from each output port. This leads to an output state of the form $|\psi\rangle_{out}=|\lambda_{01}\rangle_A|\lambda_{02}\rangle_B$ (or $|\psi\rangle_{out}=|\lambda_{01}\rangle_B|\lambda_{02}\rangle_A$, depending on the input port), where entanglement of the central wavelengths is lost. On the other hand, a beam splitter-like response with $\Delta\eta=0$ leads to the superposition $|\psi\rangle_{out}=[|\lambda_{01}\rangle_A|\lambda_{02}\rangle_B+|\lambda_{01}\rangle_B|\lambda_{02}\rangle_A]/\sqrt{2}$, where the full spectral entanglement of the input state is retained. By controlling $\Delta\eta$ through the selection of M or $\eta(\lambda_{00})$ (and thus controlling, effectively, the amount of spectral information known about the output state), a directional coupler can select any level of entanglement between these extremes.

Figure 5A:
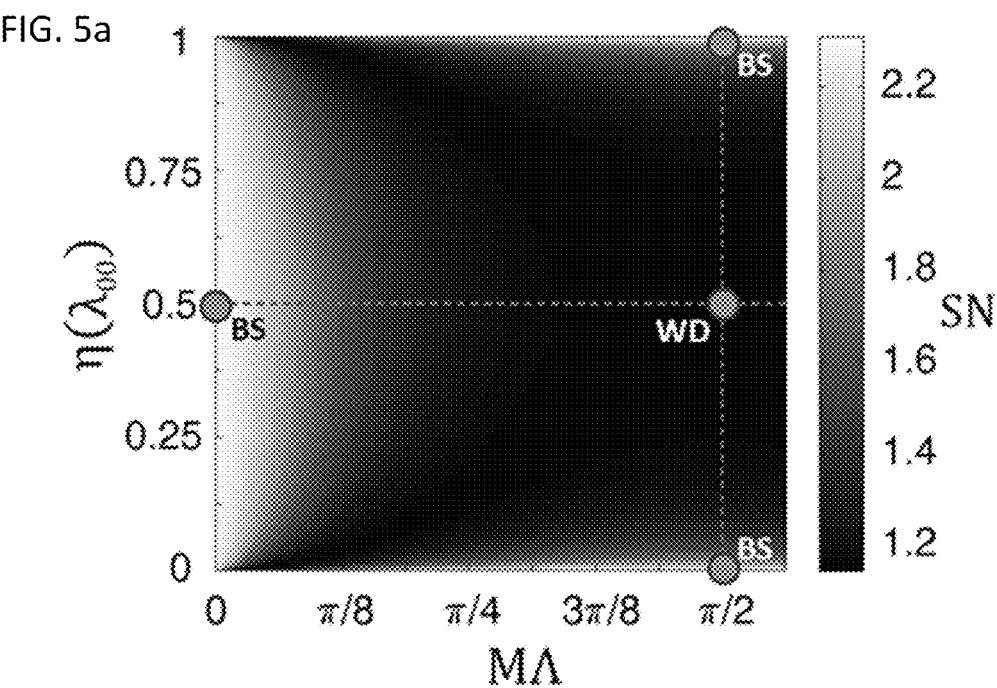
FIGS. 5a-b illustrate the tunability of output state entanglement, according to an embodiment.
Figure 5B:
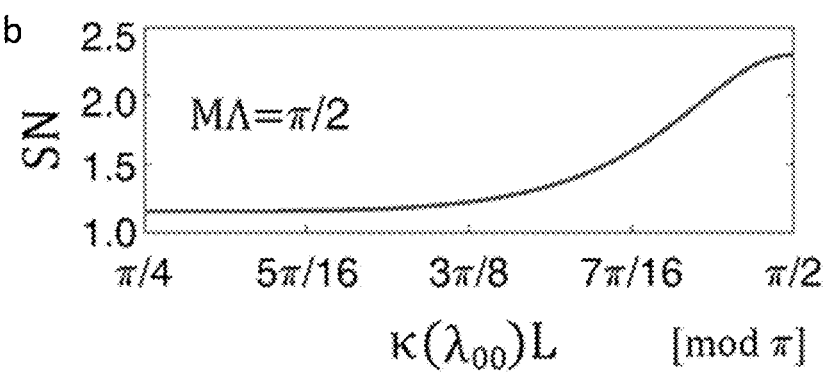

FIGS. 5a-b illustrate the tunability of output state entanglement. FIG. 5a illustrates the dependence of Schmidt number on the coupler response for post-selected outcomes where the photons are found in different waveguides. The maximum value of SN=2.31 corresponds to the input state entanglement. FIG. 5b is a plot of SN vs. $\kappa(\lambda_{00})L$ taken for a slice along $M\Lambda=\pi/2$, plotted in terms of $\eta(\lambda00)$. FIGS. 5a and 5b show how the choice of M and $\eta(\lambda_{00})$ can tailor spectral entanglement in the post-selected output state. Spectral entanglement has been quantified using the Schmidt number (SN), which has a minimum value of unity in the absence of entanglement, and increases with greater entanglement. The input state used in this example has $\Lambda=10$ nm, SN=2.31, and equal FWHM intensity bandwidths of $\Delta\lambda=1$ nm for the photon marginal spectra. It is modeled after a Type-I spontaneous parametric downconversion (SPDC) process with a degeneracy wavelength of $\lambda_{00}=1550$ nm and pump bandwidth of $\Delta\lambda_P=0.25$ nm. As the coupler response moves away from the beam splitter-like coordinates and toward the WD-like coordinate at $(M\Lambda=\pi/2, \eta(\lambda_{00})=0)$, the Schmidt number of the output state smoothly transitions from its input value of SN=2.31 down to a value of SN≅1.15. Note that some spectral entanglement remains at the WD-like coordinate even though the output paths reveal the central wavelengths. This is because the photon spectra are still inherently anticorrelated about their central wavelengths, due to energy and momentum conservation in the pair generation process. Such residual entanglement vanishes as $\Delta\lambda\rightarrow0$.

In situ tuning of the Schmidt number becomes possible through active control of $\eta(\lambda_{00})$. Effectively, this prepares states of the form $|\psi\rangle_{out}=[|\lambda_{01}\rangle_A|\lambda_{02}\rangle_B+\mu|\lambda_{01}\rangle_B|\lambda_{02}\rangle_A]/\sqrt{(1+\mu^2)}$ with a tunable value of $\mu$. We emphasize that this tuning occurs post-generation, without requiring changes to pump bandwidth, nonlinear interaction length, or any other parameters affecting the photon pair generation process. This makes it particularly well suited for tailoring spectral entanglement in a monolithically integrated setting, in applications where the photons remain path-distinguishable. In some embodiments control of $\eta(\lambda_{00})$, and thereby the Schmidt number, can be achieved electro-optically or thermally, for instance, by modifying the waveguide core-cladding index contrast to systematically shift $\kappa(\lambda_{00})$. In some embodiments, control of $\eta(\lambda_{00})$ (i.e. "tuning") may be accomplished by the quantum-confined Stark effect and, for certain fiber-based coupler assemblies, a micrometer-controlled waveguide separation. Operation along the line $M\Lambda=\pi/2$ offers the most precise control over entanglement at any nonzero Λ. The value of M is fixed but can be tailored through a judicious design of the coupler dimensions and material system. Note that, since M scales with L, dispersion can be enhanced by increasing the 50:50 coupling length beyond its minimum necessary value of $L=\pi/(4\kappa(\lambda_{00}))$.

This tuning approach also provides control over polarization entanglement, since correlations in the spectral and polarization degrees of freedom are coupled, except in the special case of maximal polarization entanglement. A state's polarization entanglement can be quantified using its concurrence C, with C=0 and C=1 indicating minimal and maximal entanglement, respectively. As the state Schmidt number increases, polarization entanglement tends to decrease, and vice-versa. This inverse relationship between SN and C allows for the on-chip preparation of non-maximally entangled states $|\psi\rangle = (|H,V\rangle + r\exp i\phi|V,H\rangle)/\sqrt{(1+r^2)}$ with a tunable value of r<1, with r related to the concurrence by $C=2r/(1+r^2)$. Such states offer significant advantages over maximally entangled states in certain applications such as closing the detection loophole in quantum nonlocality tests.

The tunable spectral entanglement we present may also have useful capabilities for two-photon spectroscopy and light-induced matter correlations. In these applications, the time ordering of when each photon reaches the sample can affect the two-photon absorption probability. This is because a particular two-photon transition can have pairings of absorption pathways corresponding to whether $\lambda_{o1}$ or $\lambda_{o2}$ is absorbed first. For some systems, when both time orderings are permitted by the incident light, these pathways destructively interfere to suppress the two-photon absorption probability, as is the case for two uncoupled two-level atoms. Such transitions can thus be selectively controlled by changing which time orderings (and hence absorption pathways) are allowed.

As illustrated in FIGS. 3a-c, control over the allowed time orderings may be achieved by placing a time delay in one path (e.g., path A) and tuning μ by tuning the coupler parameter $\eta(\lambda_{00})$. Suppose μ=0 [FIG. 3b] so that the post-selected state at the coupler output is $|\psi\rangle_{out} = |\lambda_{01}\rangle_A|\lambda_{02}\rangle$. In this case, $\lambda_{01}$ is always delayed relative to $\lambda_{02}$. Hence, only one set of time-ordered pathways is allowed. On the other hand, when μ=1 [FIG. 3c] so that $|\psi\rangle_{out} = [|\lambda_{01}\rangle_B|\lambda_{02}\rangle_A]/\sqrt{2}$, the delay is applied in superposition to either $\lambda_{01}$ or $\lambda_{02}$, and hence both sets of time-ordered pathways are allowed.

Such control over the time ordering adds to the versatility of a single on-chip light source for manipulating and probing two-photon processes, such as controlling the degree to which bi-exciton transitions may be blocked. Note that the ability to selectively excite a single absorption path (e.g., using μ=0) is only possible with quantum light sources. Classical sources have no intrinsic time ordering and hence will excite both paths equally (as with μ=1). Accordingly in some embodiments a tunable dispersive coupler may be provided that allows a sample's behavior for both the classical and nonclassical conditions to be directly compared, without the need to change the light source and with virtually no disruption to the experimental setup.

Perfect Anti-Coalescence with Tunable Visibility

Control over two-photon path correlations is another important ability for quantum photonics. In this section, we start by exploring how such correlations can be impacted by dispersion. We then describe how this enables conditions with no bulk optics equivalent; namely, perfect photon anti-coalescence that remains independent of the visibility of interference effects, even as this visibility is tuned via $\eta(\lambda_{00})$ or MΛ.

Path correlations are commonly engineered using quantum interference. In the famous Hong-Ou-Mandel effect, two photons enter a 50:50 beam splitter from different input paths (antibunched), and coalesce to exit as a bunched state where they are most likely to be found in the same output path. Ideally the antibunched (i.e., separated) outcome probability becomes $P_S=0$ under conditions of maximal interference, compared to the "classical" value of $P^C_S=0.5$ if interference were completely absent. The reverse process, called anti-coalescence, wherein $P_S \to 1$, is useful for providing interference-facilitated pair separation (IFPS) to separate photons generated by integrated sources. Note that the subscript S is used to delineate these from probabilities corresponding to bunched (i.e., non-separated) outcomes. The two-photon interference can be quantified by the interference visibility $V_S = |P^I_S|/P^C_S$, where $P^I_S = P_S - P^C_S$ represents the contribution of quantum interference toward the antibunched outcome probability.

We shall now look specifically at anti-coalescence. While perfect coalescence requires VS to be unity, coupler dispersion can lift this restriction for anti-coalescence. As we shall see, for the first time VS can be made to have any arbitrary value between 0 and 1 while the separation probability is kept constant at $P_S=1$. Anti-coalescence requires a path-entangled input state of the form $$|\Psi\rangle = [|\psi\rangle_A|0\rangle_B + e^{-i\theta}|0\rangle_A|\psi\rangle_B]/\sqrt{2}, \quad (1)$$

where $|0\rangle$ refers to vacuum, $|\psi\rangle_j$ represents a photon pair in path j, and θ is a relative phase shift. Such states can be generated by coherently pumping two sources of photon pairs. This places no restrictions on the tunability of the photon pair sources. The spectral properties of $|\psi\rangle_j$ are described by the biphoton amplitude (BPA) $\phi(\omega_1, \omega_2)$. We will assume perfect path indistinguishability such that $\phi(\omega_1, \omega_2) = \phi^B(\omega_1, \omega_2) \equiv \phi(\omega_1, \omega_2)$.

FIGS. 4a-f illustrate how $P_S$, $P^C_S$, $P^I_S$, and $V_S$ change as a function of the coupler parameters when the relative phase shift is either θ=0 or θ=π. These plots have been generated for a co-polarized input state from Type-I SPDC having Δλ=0.25 nm, $\Delta\lambda_P=0.1$ nm and a degeneracy wavelength of $\lambda_{00}=780$ nm. The value of $|P^I_S|$ is maximal at coordinates where the coupler responds as a 50:50 beam splitter, and minimal when it responds as a WD. The "classical" probability $P^C_S$ follows roughly the opposite trend, obtaining its maximal value of $P^C_S=1$ for a WD-like response, and decreasing to $P^C_S=0.5$ for beam splitter-like responses. Curiously, along the lines $\eta(\lambda_{00})=0.5$ and MΛ=π/2, changes to $P^C_S$ and $|P^I_S|$ are in perfect balance such that their sum always equals unity. This balancing is associated with the condition $\eta(\lambda_{01})+\eta(\lambda_{02})=1$, which leads to PS=1 and hence perfect anti-coalescence (i.e., deterministic separation) along either $\eta(\lambda_{00})=0.5$ or MΛ=π/2, selected through the choice of θ. Along these two lines, the interference visibility $V_S$ varies smoothly between 0 and 1. By operating at MΛ=π/2 with θ=π, and actively controlling $\eta(\lambda_{00})$ through thermal or electro-optic tuners, any value of $V_S$ can be selected while maintaining a perfect separation fidelity. Note that, unlike before, this does not alter the spectral entanglement of post-selected output states, due to the presence of path entanglement at the input.

Figure 6:
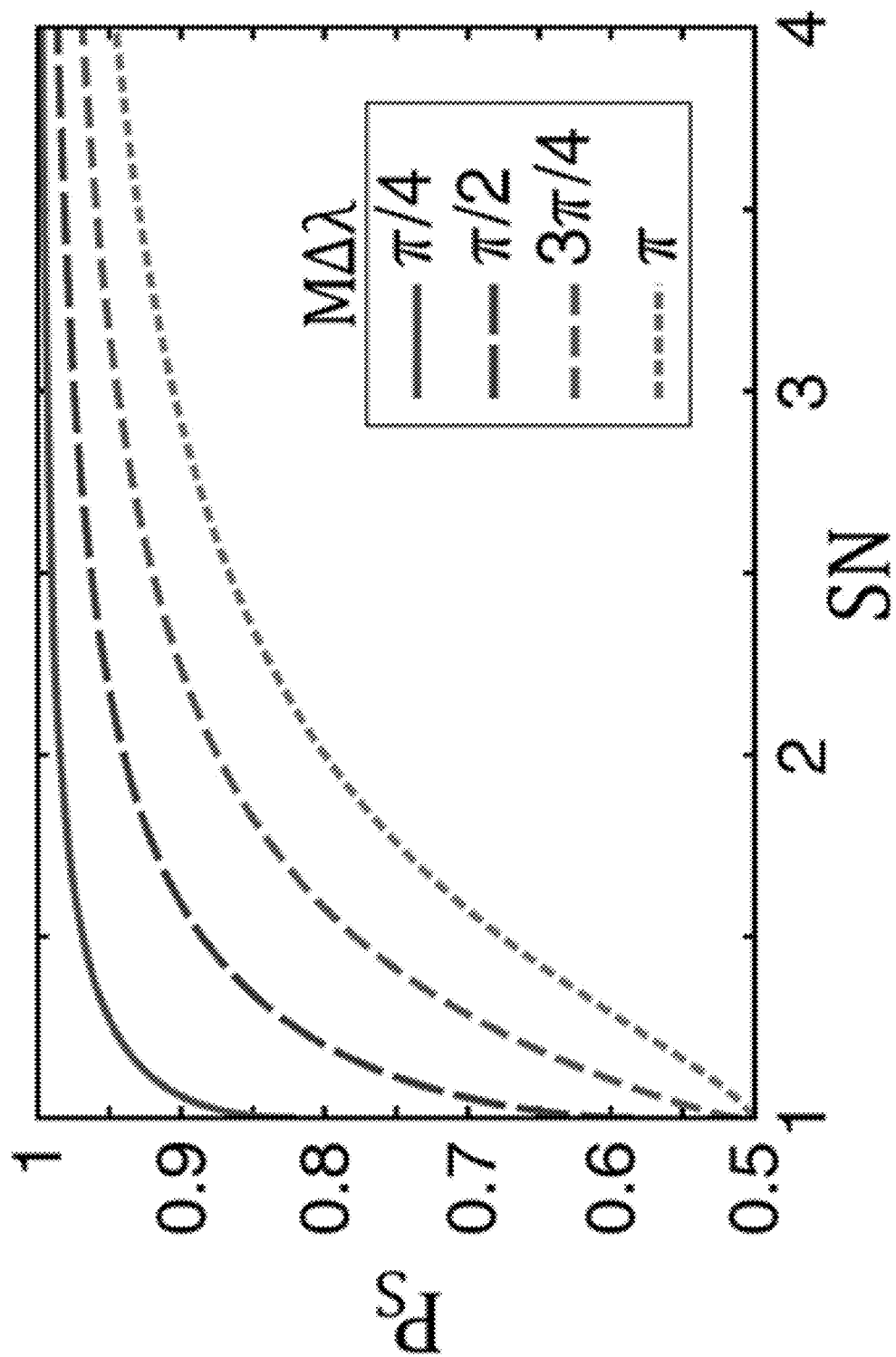
FIG. 6 is a plot illustrating the dependence of $P_S$ on entanglement, according to an embodiment.

Opportunities for State Characterization
Entanglement-Sensitive Coincidence Detection For most permutations of coupler and state attributes, $P_S$ is accurately described by the behavior in FIGS. 4a-f. However, deviations from the values of $P_S$ shown can occur when the dimensionless product MΔλ, involving coupler dispersion and photon bandwidth, becomes large. FIG. 6 indicates that the extent of these deviations depends not only on MΔλ, but also on the spectral entanglement of the input state. This opens up the possibility of discerning the Schmidt number of the input state from the anti-bunched coincidence count rate at the coupler output, which is proportional to $P_S$.

The results in FIG. 6 were calculated for degenerate input states having $\Lambda=0$ nm, $\Delta\lambda=10$ nm, $\lambda_{00}=780$ nm, and $\theta=0$. The product MΔλ was swept by varying M, with $\eta(\lambda_{00})=0.5$ kept constant. Input state entanglement was controlled through the Type-I SPDC pump bandwidth $\Delta\lambda_P$. In the limit of MΔλ→0, the above calculation parameters give $P_S=1$, in agreement with FIG. 4e. Larger values of MΔλ lead to decreases in $P_S$. However, increasing the SN of the input state has the effect of asymptotically restoring $P_S$ to unity.

State Representation: A co-polarized pair with both photons beginning in waveguide j can be represented by the pure state $$|\psi\rangle_j = \int d\omega_1 d\omega_2 \phi(\omega_1,\omega_2) \hat{a}^{j\dagger}(\omega_1) \hat{a}^{j\dagger}(\omega_2) |vac\rangle, \quad (A.1)$$

where $\hat{a}^{j\dagger}(\omega)$ is the canonical mode creation operator for waveguide j. The BPA is normalized according to $\int d\omega_1 d\omega_2 |\phi(\omega_1,\omega_2)|=1$. Rather than generating the BPA from device-specific mode dispersion parameters, it is more convenient to define the BPA directly in terms of the photon bandwidths and central wavelengths of interest. A BPA that mimics the output of a Type I SPDC process can be constructed from $$\phi(\omega_1,\omega_2)=\phi_P(\omega_1+\omega_2)[\phi_1(\omega_1)\phi_2(\omega_2)+\phi_2(\omega_1)\phi_1(\omega_2)], \quad (A.2)$$

where $\phi_n(\omega)$ are the marginal photon spectra and $\phi_P(\omega_1+\omega_2)$ is the pump spectrum. This construction satisfies the necessary exchange symmetry and has all of the key qualitative features of a typical Type I BPA computed from SPDC theory. The marginal spectra were Gaussian and defined in terms of wavelength as $\phi(\lambda)=\exp(-2\ln 2[\lambda-\lambda_{0n}]^2/\Delta\lambda^2)$, with equal FWHM intensity bandwidths of Δλ. The pump spectrum was also Gaussian with a FWHM intensity bandwidth of $\Delta\lambda_P$. Narrowing $\Delta\lambda_P$ below Δλ has the effect of increasing the spectral correlations, and hence Schmidt Number, of the two-photon state.

Evolution through a directional coupler: Consider the evolution of the pure state $|\Psi\rangle$ of Eq. (A.1) through a directional coupler of length L and coupling strength $\kappa(\omega)$. It is assumed that the output remains in a pure state. Let $\hat{b}$ if $(\omega)$ represent the mode operators at the coupler output. These are related to the input mode operators by $$\begin{bmatrix} \hat{b}^{A+}(\omega) \\ \hat{b}^{B+}(\omega) \end{bmatrix} = \begin{bmatrix} \cos(\kappa(\omega)L) & i\sin(\kappa(\omega)L) \\ i\sin(\kappa(\omega)L) & \cos(\kappa(\omega)L) \end{bmatrix} \begin{bmatrix} \hat{a}^{A+}(\omega) \\ \hat{a}^{B+}(\omega) \end{bmatrix}. \quad (A.3)$$

Note that the magnitude of the matrix elements in Eq. (A.3) are related to the power-splitting ratio by $|\cos(\kappa(\omega)L)|=[\eta(\omega)]^{1/2}$ and $|\sin(\kappa(\omega)L)|=[1-\eta(\omega)]^{-1/2}$. Using this transformation, the state BPAs at the output of the coupler can be written as $$\Phi^{j\to pq}(\omega_1,\omega_2) = \phi^j(\omega_1,\omega_2) G^{j\to p}(\omega_1) G^{j\to q}(\omega_2), \quad (A.4)$$

Where $$G^{j\to q}(\omega) = \begin{cases} \cos(\kappa(\omega)L), & \text{if } j=q, \\ \sin(\kappa(\omega)L), & \text{if } j \neq q. \end{cases} \quad (A.5)$$

In terms of our notation, $\Phi^{j\to p}(\omega_1,\omega_2)$ is the amplitude associated with photons 1 and 2 being coupled from input path j to output paths p and q, respectively. While the form of Eq. (A.4) is general, the $G^{j\to q}(\omega)$ will change if a different coupler architecture is used (such as an asymmetric coupler).

Two-photon outcome probabilities: The probability of finding photons 1 and 2 in output paths p and q, respectively, is calculated from $P_{pq} = \langle \Psi|\hat{b}^{p\dagger}\hat{b}^{q\dagger}\hat{b}^q\hat{b}^p|\Psi\rangle$ and found to be $$P_{pq} = R_{pq}^C + \cos(\pi\delta_{pq}) R_{pq}^I(\theta), \quad (A.6)$$

where $\delta_{pq}$ is the Kronecker delta, $$R_{pq}^C = \int d\omega_1 d\omega_2 (|\Phi^{A\to pq}(\omega_1,\omega_2)|^2 + |\Phi^{B\to pq}(\omega_1,\omega_2)|^2), \quad (A.7)$$

is the "classical" probability contributed by sources A and B in the absence of interference, and $$R_{pq}^I(\theta) = \int d\omega_1 d\omega_2 2Re\{e^{-i\omega}\Phi^{B\to pq}(\omega_1,\omega_2)\Phi^{*A\to pq}(\omega_1,\omega_2)\}, \quad (A.8)$$

is a nonclassical modifier accounting for the effects of path interference. These expressions are given in their most general form so that they can be readily applied to any arbitrary set of coupler and two-photon state attributes. Note that $\Sigma_{pq} P_{pq}=1$. The probability $P_S$ of obtaining an anti-bunched (separated) outcome is then $$P_S = P_{AB} + P_{BA} = P_S^C + P_S^I, \quad (A.9)$$

with "classical" and "interference" components given by $P_S^C = R_{AB}^C + R_{BA}^C$ and $P_S^I = R_{AB}^I + R_{BA}^I$.

Obtaining $V_S$ for on-chip measurement of Λ: We refer to the configuration shown in FIG. 7. Let $P(\Lambda,\tau)$ represent the total antibunched outcome probability at nondegeneracy Λ and relative time delay τ. Assuming $(\lambda_{00})=0.5$ and $\theta=0$, $P_S(\Lambda,0)=1$ at all values of Λ. The coincidence detection rate $R_0$ at zero delay therefore corresponds to maximum separation fidelity; thus the probability of pair separation at nonzero delay τ can be obtained from $P(\Lambda,\tau)=R_\tau/R_0$. Provided τ is large enough that $|\psi\rangle_A$ and $|\psi\rangle_B$ (the possible photon-pair histories) are no longer coherent, quantum interference will not occur at that delay time; thus, $P^I(\Lambda,\tau)=0$ and $P_S(\Lambda,\tau) = P^C_S(\Lambda,\tau)$. It then follows from the definition of $V_S$ that $$V_S = \frac{|P_S(\Lambda,0) - P_S(\Lambda,\tau)|}{P_S(\Lambda,\tau)} = \frac{|1 - R_\tau/R_0|}{R_\tau/R_0} = \left|\frac{R_0}{R_\tau} - 1\right|. \quad (A.10)$$

For $\eta(\lambda_{00})=0.5$, the visibility $V_S$ maps to a unique value of MΛ provided MΛ≤π/2 [due to periodicity of $V_S$; see FIG. 4d].

This behavior can be understood by examining Eqs. (A.3)-(A.9). The probability $P_S$ is determined from a sum over all possible combinations of frequencies $\omega_1 = 2\pi c/\lambda_1$ and $\omega_2 = 2\pi c/\lambda_2$ weighted by the BPA. When the state is spectrally uncorrelated (i.e., SN=1), the combinations of $\eta(\lambda_1)$ and $\eta(\lambda_2)$ contributing to this sum are not necessarily equidistant from $\eta(\lambda_{00})=0.5$ and hence can deviate from the $\eta(\lambda_1)+\eta(\lambda_2)=1$ condition required for perfect anti-coalescence. However, when the photons are spectrally anticorrelated due to entanglement, the BPA restricts all contributing $\lambda_1$, $\lambda_2$ combinations to be approximately equidistant from $\lambda_{00}$, which acts to restore the splitting ratio antisymmetry. Larger products of $M\Delta\lambda$ allow $P_S$ to be more severely degraded because a greater proportion of the nonvanishing $\lambda_1$, $\lambda_2$ combinations are able to violate the antisymmetry. Only in the limit of $\Delta\lambda \to 0$, where the state is entirely described by the central wavelengths $\lambda_{01}$ and $\lambda_{02}$, is the splitting ratio antisymmetry condition strictly enforced.

Figure 7:
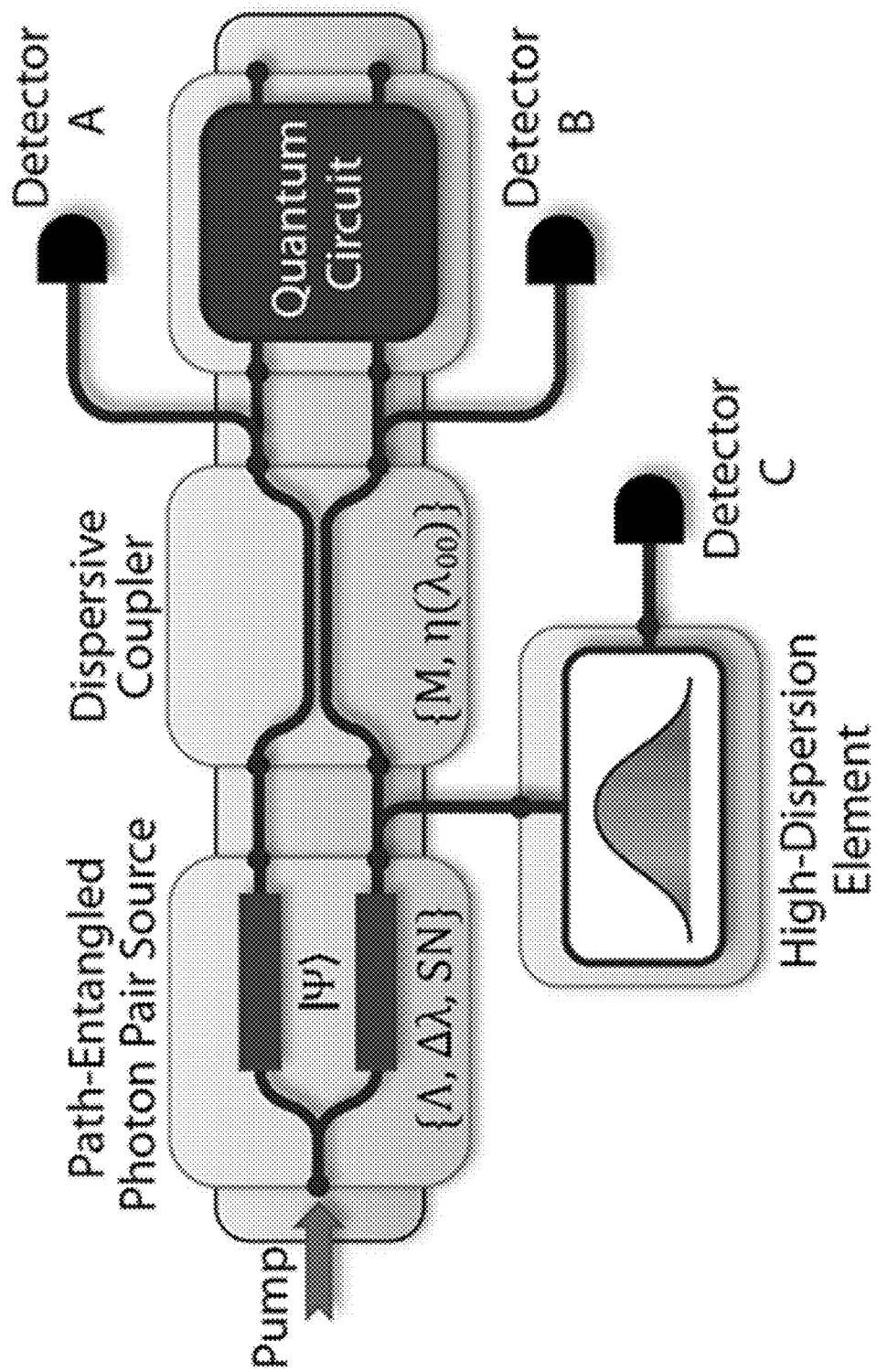
FIG. 7 illustrates an embodiment of an all-integrated SN measurement.

The bandwidth and entanglement sensitivity of $P_S$ grants dispersive couplers additional capabilities for state characterization. For example, dispersive couplers could empower a simple, fast, all-integrated technique for measuring the Schmidt number of an ensemble of states without needing to perform full state tomography to reconstruct the BPA. FIG. 7 illustrates an embodiment of a device for measuring the Schmidt number of an ensemble of states. In this case, we show the photons being characterized immediately after leaving the source, in the context of source calibration. However, they could also be measured after interacting with a bath or system. This could be helpful, for example, in metrological applications where the Schmidt number is monitored as an indication of state purity and hence the interaction under investigation. To obtain SN, first the marginal photon spectra are measured with a waveguide-assisted spectrograph method that uses chromatic group velocity dispersion (GVD) to map spectral components to time-of-arrival at a single-photon detector. Next, provided M is known, the values of $\Delta\lambda$ and $\Lambda$ measured in the first step are used to discern SN from standard two-photon coincidence measurements at the coupler outputs. The sensitivity of the technique diminishes as the photons are made narrowband or increasingly entangled, but can be enhanced by designing the coupler to have M as large as possible.

Obtaining SN by previous methods would require a measurement of the full BPA, which hinges on the spectral resolution of the measurement system. Measuring the BPA entirely on chip is possible using spectrographs, but its resolution can be severely limited by detector timing jitter. In comparison, precise values of $\Delta\lambda$ and $\Lambda$ for the coupler-assisted technique are more easily obtained, in part due to the straightforward use of interpolation to increase confidence in these values, but also because uncertainties from the limited spectral resolution enter only in one axis, as opposed to two. Hence, the trade-offs between the number of measurements, the total measurement time, and precision in SN scale more favorably for the coupler-assisted technique. A direct, rapid, and precise measurement of SN would be particularly useful for the real-time monitoring of sources where SN is tunable and is being used as a control parameter. Additionally, it would be advantageous for monitoring a stream of states whose properties reveal real-time information about a dynamic system or environment.

The converse functionality—estimating the photon bandwidth for a known Schmidt number—could also be useful, in the context of indistinguishable pure photons having tunable attributes. As long as the SN remains reasonably close to unity, $\Delta\lambda$ could be measured entirely on chip using only the coupler and coincidence detectors, without the need for tunable bandpass filters, GVD fibers, or spectrometer capabilities. Presently, highly bandwidth-tunable pure photons can be generated in a free-space setup, but recent trends toward integration suggest that this capability may eventually be available in a monolithic platform, where on-chip characterization would be helpful for source calibration and monitoring drift.

Versatility of Dispersive Couplers

Referring to FIG. 7, an embodiment of an all-integrated SN measurement is presented. To apply the technique of the embodiment of FIG. 7, the photon pairs must be in the generic path-entangled state $|\psi\rangle$ of Eq. (1). The relative phase is ideally $\theta=0$; for other values of $\theta$, $P_S$ is less sensitive to SN. To measure SN, the state is sampled at three locations (shown as Y-junctions for simplicity). Detectors A and B sample the two-photon statistics at the coupler output to obtain $P_S$. Detector C obtains spectrographs, and hence $\Lambda$ and $\Delta\lambda$, by sampling $|\psi\rangle$ via a high-dispersion element such as a fiber or a waveguide grating operated near its band edge. It is sufficient to measure these spectrographs from only one of the source output paths, since the photon pair properties are assumed to be path-indistinguishable (i.e., $|\psi\rangle A=|\psi\rangle B$). The data obtained for $\Lambda$ and $\Delta\lambda$ (together with the dispersive coupler attributes) can then be used to map the measured $P_S$ to a corresponding value of SN (e.g. see FIG. 6).

Figure 8:
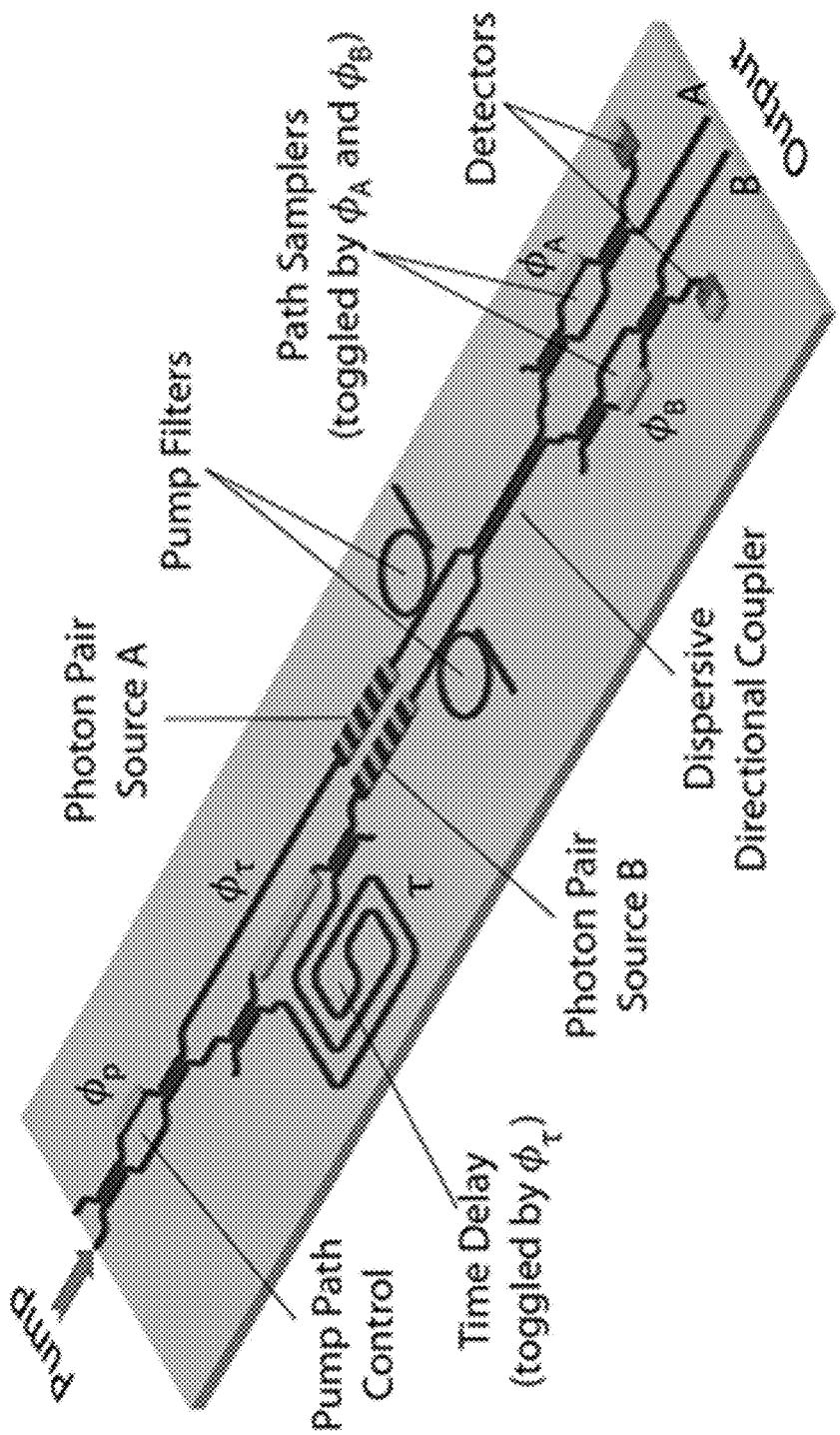
FIG. 8 illustrates an embodiment of a multipurpose dispersive coupler for state characterization.

Referring to FIG. 8, an embodiment of a multipurpose dispersive coupler for state characterization is presented. A path superposition of the form $|\Psi\rangle$ (Eq. A.1) is created through coherent pumping of two waveguide sources of photon pairs (e.g., generated via parametric downconversion). A tunable MachZehnder interferometer (MZI) allows the relative time delay to be set to either zero ($\phi_\tau=0$) or $\tau(\phi_{96}=\pi)$ by selecting between paths, with the longer path introducing a time delay $\tau$ when the photon is switched onto the longer path. Pump power can be adjusted between paths via $\phi_p$ to compensate for asymmetric losses when the delay of $\tau$ is implemented. Unconverted pump photons are removed using ring filters. MZIs at the output can be toggled ($\phi_B=\pi$) to sample the two-photon correlations with single-photon detectors. The rate of detection coincidences for zero time delay and a delay of $\tau$ can be used to determine $V_S$, which in turn reveals $M\Lambda$. The dispersive directional coupler must have $\eta(\lambda_{00})=\frac{1}{2}$ for this measurement. Note that adding electro-optic or thermal tuners to the dispersive coupler can enable arbitrary control over $V_S$ by tuning $\eta(\lambda_{00})$. Spectral-entanglement tuning is also possible when $\phi_p$ is set to deliver pump power to only one of the two photon pair sources.

Since couplers are already an essential on-chip device, the state characterization capabilities granted to them by dispersion can be exploited with minimal increase to the circuit complexity or footprint. This allows dispersive couplers to provide an extremely versatile set of functionalities in a compact form factor, which the following example highlights. Consider the reconfigurable circuit in FIG. 8. The dispersive coupler in this circuit can serve several purposes. It can provide IFPS to deterministically separate the photons at the coupler output. With the addition of electro-optic or thermal tuning, it can also be utilized for other previously described state engineering functionalities, such as tunable spectral entanglement. On top of this, the circuit could easily be modified for coupler-based SN measurements by tapping photon source B with a high-dispersion element and an additional detector, as per FIG. 7. Accomplishing all of these tasks through a single dispersive coupler may help to make most efficient use of precious on-chip real estate.

Even without adding a tap to source B for a spectrograph measurement, the circuit in FIG. 8 can already access some information about the state. The relationship between $V_S$ and $\Lambda$ described above provides a route for measuring the nondegeneracy $\Lambda$ of an ensemble of states entirely on chip. This requires the toggling of a time delay $\tau$ between the dispersive coupler input paths. The interference visibility is obtained from $V_S=|R_0/R_\tau-1|$, where $R_0$ is the coincidence count rate at zero time delay (as measured by on-chip single photon detectors), and $R_\tau$ is the coincidence rate at a time delay $\tau$ that is much larger than the two-photon coherence time. Provided M is known, this value of $V_S$ can be mapped back to the state nondegeneracy $\Lambda$, as per FIG. 4d. This technique is best applied to narrowband photons since the sensitivity of $V_S$ to $\Lambda$ decreases as $M\Lambda$ becomes large.

Integrated couplers are already becoming a key building block of photonic quantum circuits. This is partly because they offer greater stability and scalability than bulk-optics beam splitters and other bench-top components. It is also because the highly precise micron-scale fabrication of such couplers helps eliminate path-length mismatches and other path asymmetries, which is critical for achieving high-fidelity quantum interference. However, in addition to these known benefits, our work has revealed an as-of-yet untapped potential for integrated couplers to be utilized in a more versatile way, far beyond their traditional role as a beam splitter substitute.

We found that harnessing the full dispersion properties of an integrated directional coupler unlocks many novel capabilities for the device. These include tunable photon entanglement and time ordering, as well as bandwidth-sensitive and entanglement-sensitive two-photon effects that can be exploited for state characterization. Some of these capabilities can be achieved in bulk optics, but not with the convenience nor stability that this integrated approach provides. Yet others have no bulk-optics counterpart, such as the ability to fully tune the two-photon interference visibility (i.e., the sensitivity to time delays at the coupler input) while maintaining a constant flux of separated (i.e., anticoalesced) photon pairs. Particularly remarkable is that all of these functionalities can be provided by a single integrated coupler, making it a versatile yet compact tool for both state engineering and on-chip state characterization. This is made possible by the capacity of dispersive couplers to smoothly transition between the extremes of beam splitter and wavelength-demultiplexer behavior, in a manner without parallel in bulk optics.

FIGS. 9 & 10 illustrate some useful equations when reviewing the above description.

What is claimed is:

1. A method for selecting a level of entanglement between two nondegenerate photons comprising:
   receiving the two nondegenerate photons through a single input port of a directional photonic coupler;
   adjusting one of a first-order coupler dispersion M or a power splitting ratio $\eta(\lambda 00)$ of the directional optical coupler to select a $\Delta\eta$;
   emitting the two nondegenerate photons from corresponding output ports of the directional optical coupler, wherein the emitted photons have a spectral entanglement corresponding to the selected $\Delta\eta$; and
   selecting a level of time-ordering between the two emitted nondegenerate photons by applying a time delay $\tau$ to one of the output ports, wherein the time delay converts the selected $\Delta\eta$ path-entanglement characteristics into time-ordering characteristics of the emitted photons.

2. The method of claim 1, wherein the adjusting comprises adjusting a waveguide core-cladding index of the directional optical coupler.

3. The method of claim 1, wherein the adjusting comprises adjusting a separation of waveguides of the directional optical coupler.

4. The method of claim 1, further comprising selecting a level of interference visibility at a fixed photon pair anti-bunching (separation) rate for the two nondegenerate photons, wherein the receiving two nondegenerate photons further comprises receiving two nondegenerate photons that are path-entangled across two input ports of the directional optical coupler with a relative phase of $\theta=\pi$ between paths; and, wherein the adjusting comprises: for a given M, adjusting $\eta(\lambda 00)$ of the directional optical coupler to select a desired interference visibility.

5. A method for selecting a level of entanglement between two nondegenerate photons comprising:
   receiving the two nondegenerate photons through a single input port of a directional photonic coupler;
   adjusting one of a first-order coupler dispersion M or a power splitting ratio $\eta(\lambda 00)$ of the directional optical coupler to select a $\Delta\eta$;
   emitting the two nondegenerate photons from corresponding output ports of the directional optical coupler, wherein the emitted photons have a spectral entanglement corresponding to the selected $\Delta\eta$; and
   selecting a level of interference visibility at a fixed photon pair anti-bunching (separation) rate for the two nondegenerate photons, wherein the receiving the two nondegenerate photons further comprises receiving two nondegenerate photons that are path-entangled across two input ports of the directional optical coupler with a relative phase of $\theta=\pi$ between paths; and, wherein the adjusting comprises: for a given M, adjusting $\eta(\lambda 00)$ of the directional optical coupler to select a desired interference visibility.

6. The method of claim 5, wherein the adjusting comprises adjusting a waveguide core-cladding index of the directional optical coupler.

7. The method of claim 5, wherein the adjusting comprises adjusting a separation of waveguides of the directional optical coupler.

8. The method of claim 5, further comprising selecting a level of time-ordering between the two nondegenerate photons by applying a time delay $\tau$ to one of the output ports, wherein the time delay converts the selected $\Delta\eta$ path-entanglement characteristics into time-ordering characteristics of the emitted photons.

9. A device for selecting a level of entanglement between two nondegenerate photons comprising:
   a directional optical coupler adapted to receive two nondegenerate photons through a single input port; and,
   means for adjusting a power splitting ratio $\eta(\lambda)$ between a pair of waveguides of the directional optical coupler to a selected $\Delta\eta$;
   wherein emitted photons from the directional optical coupler have a spectral entanglement corresponding to the selected $\Delta\eta$.

10. The device of claim 9, wherein the means for adjusting the power splitting ratio $\eta(\lambda)$ comprises means for adjusting a waveguide core-cladding index of the directional optical coupler.

11. The device of claim 9, wherein the means for adjusting the power splitting ratio $\eta(\lambda)$ comprises means for adjusting a separation of the pair of waveguides of the directional optical coupler.

12. The device of claim 9, wherein the means for adjusting the power splitting ratio $\eta(\lambda)$ comprises a coupling length of the directional optical coupler longer than a minimum necessary value ($L=\pi/(4\kappa(\lambda_{00}))$).

13. The device of claim 9, further operative to select a level of time-ordering between the two nondegenerate photons, wherein the device further comprises an extended path in one leg of the directional optical coupler, the extended path applying a time delay $\tau$ to one of the output ports, wherein the time delay τ converts the selected Δη path-entanglement characteristics into time-ordering characteristics of the emitted photons.

14. The device of claim 9, further operative to select a level of interference visibility at a fixed photon pair anti-bunching (separation) rate for the two nondegenerate photons, wherein the directional optical coupler is adapted to receive the two nondegenerate photons as path-entangled photons across two input ports of the directional optical coupler with a relative phase of θ=π between paths; and wherein, for a given M, the means for adjusting the power splitting ratio η(λ) of the directional optical coupler is configured to adjust η(λ00) of the directional optical coupler to select a desired interference visibility.

* * * * *